United States Patent
Xiong (10) Patent No.: US 10,624,163 B1
(45) Date of Patent: Apr. 14, 2020

(54) LIGHTING DEVICE WITH OUTPUT BUFFER CIRCUIT FOR STABILITY DURING NO-LOAD OR STANDBY OPERATION

(71) Applicant: UNIVERSAL LIGHTING TECHNOLOGIES, INC., Madison, AL (US)

(72) Inventor: Wei Xiong, Madison, AL (US)

(73) Assignee: Universal Lighting Technologies, Inc., Madison, AL (US)

(*) Notice: Subject to any disclaimer, the term of this patent is extended or adjusted under 35 U.S.C. 154(b) by 0 days.

(21) Appl. No.: 16/142,935

(22) Filed: Sep. 26, 2018

Related U.S. Application Data (60) Provisional application No. 62/565,622, filed on Sep. 29, 2017.

(51) Int. Cl.
*H05B 33/08* (2020.01)
*H02M 3/335* (2006.01)
*H02M 1/42* (2007.01)

(52) U.S. Cl.
CPC ...... *H05B 33/0815* (2013.01); *H02M 1/4258* (2013.01); *H02M 3/33538* (2013.01); *H02M 3/33569* (2013.01)

(58) Field of Classification Search
CPC ........... H02M 1/4258; H02M 3/33538; H02M 3/33569; H05B 33/0815
See application file for complete search history.

(56) References Cited

U.S. PATENT DOCUMENTS

| | | | | |
|---|---|---|---|---|
| 2010/0277957 | A1* | 11/2010 | Chueh | H02M 3/33569 363/21.07 |
| 2014/0167640 | A1* | 6/2014 | Knoedgen | H02M 3/158 315/239 |
| 2014/0252981 | A1* | 9/2014 | Xie | H02M 3/33507 315/291 |
| 2016/0057825 | A1* | 2/2016 | Hu | H05B 33/0815 315/201 |
| 2016/0276936 | A1* | 9/2016 | Gritti | H02M 1/4258 |
| 2017/0179831 | A1* | 6/2017 | Yu | H02M 3/33569 |
| 2018/0153020 | A1* | 5/2018 | Sun | H02M 3/33553 |
| 2018/0234019 | A1* | 8/2018 | Chen | H02M 1/36 |

\* cited by examiner

*Primary Examiner* — Adolf D Berhane
*Assistant Examiner* — Kevin H Sprenger
(74) *Attorney, Agent, or Firm* — Patterson Intellectual Property Law, P.C.; Gary L. Montle (57) ABSTRACT

A lighting device includes a switch coupled to receive DC input, and driven on/off by received gate drive signals to provide current through a primary transformer winding. A large output capacitor is coupled across output terminals for receiving a load. An output circuit is coupled between a secondary transformer winding and the output capacitor, and includes a small buffer capacitor and a buffer diode. A feedback circuit compares a voltage across the buffer capacitor with a reference signal and provides a feedback control signal for regulating the switch and accordingly the device output to the load. An auxiliary power supply includes a tertiary transformer winding and powers the feedback circuit. By implementing the voltage across the buffer capacitor, the discharge time during a non-standard operating condition (e.g., no load) is small enough to enable continuous operation of the auxiliary power supply, the feedback circuit and the switch.

15 Claims, 5 Drawing Sheets

LIGHTING DEVICE WITH OUTPUT BUFFER CIRCUIT FOR STABILITY DURING NO-LOAD OR STANDBY OPERATION

CROSS-REFERENCES TO RELATED APPLICATIONS

This application claims benefit of U.S. Provisional Patent Application No. 62/565,622, filed Sep. 29, 2017, and which is hereby incorporated by reference.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND

The present disclosure relates generally to power supplies that provide a constant DC output current to a load, such as, for example, light-emitting diodes. More particularly, the present disclosure relates to a lighting device including output buffer circuitry to stabilize operation in a standby mode or a no-load mode.

The usage of light-emitting diodes (LEDs) to provide illumination is increasing rapidly as the cost of LEDs decrease and the endurance of the LEDs increases to cause the overall effective cost of operating LED lighting products to be lower than incandescent lamps and fluorescent lamps providing equivalent illumination. Also, LEDs can be dimmed by controlling the current through the LEDs because LEDs are current driven devices. The current through a plurality of LEDs in a lighting device must be controlled tightly in order to control the illumination provided by the LEDs. Typically, the secondary (output side) of an LED lighting device must be electrically isolated from the primary (line and neutral side) of the lighting device to meet applicable safety standards (e.g., IEC class II isolation). In addition, an LED driver circuit should desirably have a high power factor and constant voltage control.

For standard operating conditions, an exemplary lighting device according to various conventional designs will operate in a continuous mode and serve as a constant voltage supply to a load connected thereto. However, during non-standard operating conditions, such as a no-load condition or a low power standby condition, conventional lighting devices may be configured to operate in a pulse mode so as to maintain the desired average output voltage. This may be undesirable for a number of reasons, particularly in one exemplary context as described herein where an auxiliary circuit is provided to receive input power from the active driving circuit and further serve as a power supply for the control circuitry.

In applications where for example a dimming controller is provided as part of a feedback circuit to receive and process external dimming input signals, it would be desirable for such circuitry to remain effective during all operating modes for the lighting device.

BRIEF SUMMARY

An exemplary lighting device as disclosed herein may be configured to stabilize operation during non-standard operating conditions, such as for example a standby mode or a no-load mode.

In a particular embodiment, a lighting device such as a light-emitting diode (LED) driver includes first and second input terminals for receiving a DC supply voltage. At least one switching element is coupled to at least one of the input terminals, and is driven on and off by received gate drive signals to provide a current through a primary winding of an isolation transformer. A first energy storage device (e.g., a large output capacitor) is coupled across first and second output terminals for connecting to a load such as an array of LED's. An output circuit is coupled between a secondary winding of the isolation transformer and the output terminals, wherein the output circuit comprises a second energy storage device (e.g., a small buffer capacitor) coupled across the secondary winding and a diode connected between respective first ends of the first and second energy storage devices. A controller provides the gate drive signals to the at least one switching element responsive to at least a feedback control signal corresponding to a voltage across the second energy storage device.

In an embodiment, the lighting device further comprises a feedback circuit configured to receive a first signal corresponding to the voltage across the second energy storage device, wherein the feedback circuit is further configured to provide the feedback control signal to the controller based on first signal and a reference signal. The reference signal may for example be a dimming reference signal received by the feedback circuit from an external dimming device.

In an embodiment, the feedback circuit comprises a comparison circuit configured to receive and compare the first signal and the reference signal, and an isolation circuit configured to receive an output from the comparison circuit and provide the feedback control signal to the controller.

In an embodiment, the lighting device further includes an auxiliary power supply for the feedback circuit. The auxiliary power supply may include a small capacitor coupled across a tertiary winding magnetically coupled to the primary winding of the isolation transformer, wherein an auxiliary power supplied to the feedback circuit corresponds to current received through the tertiary winding.

In an embodiment, a discharge time of the second energy storage device (e.g., buffer capacitor) during a non-standard condition of the lighting device is less than a time between successive gate drive signals as corresponding to continuous operation of the auxiliary power supply and the feedback circuit, further wherein an output voltage is continuously maintained across the first energy storage device (e.g., output capacitor). The non-standard condition may be a standby condition and/or a no-load condition.

DETAILED DESCRIPTION

Referring generally to the figures, various exemplary embodiments of an invention may now be described in detail. Where the various figures may describe embodiments sharing various common elements and features with other embodiments, similar elements and features are given the same reference numerals and redundant description thereof may be omitted below.

Figure 1:
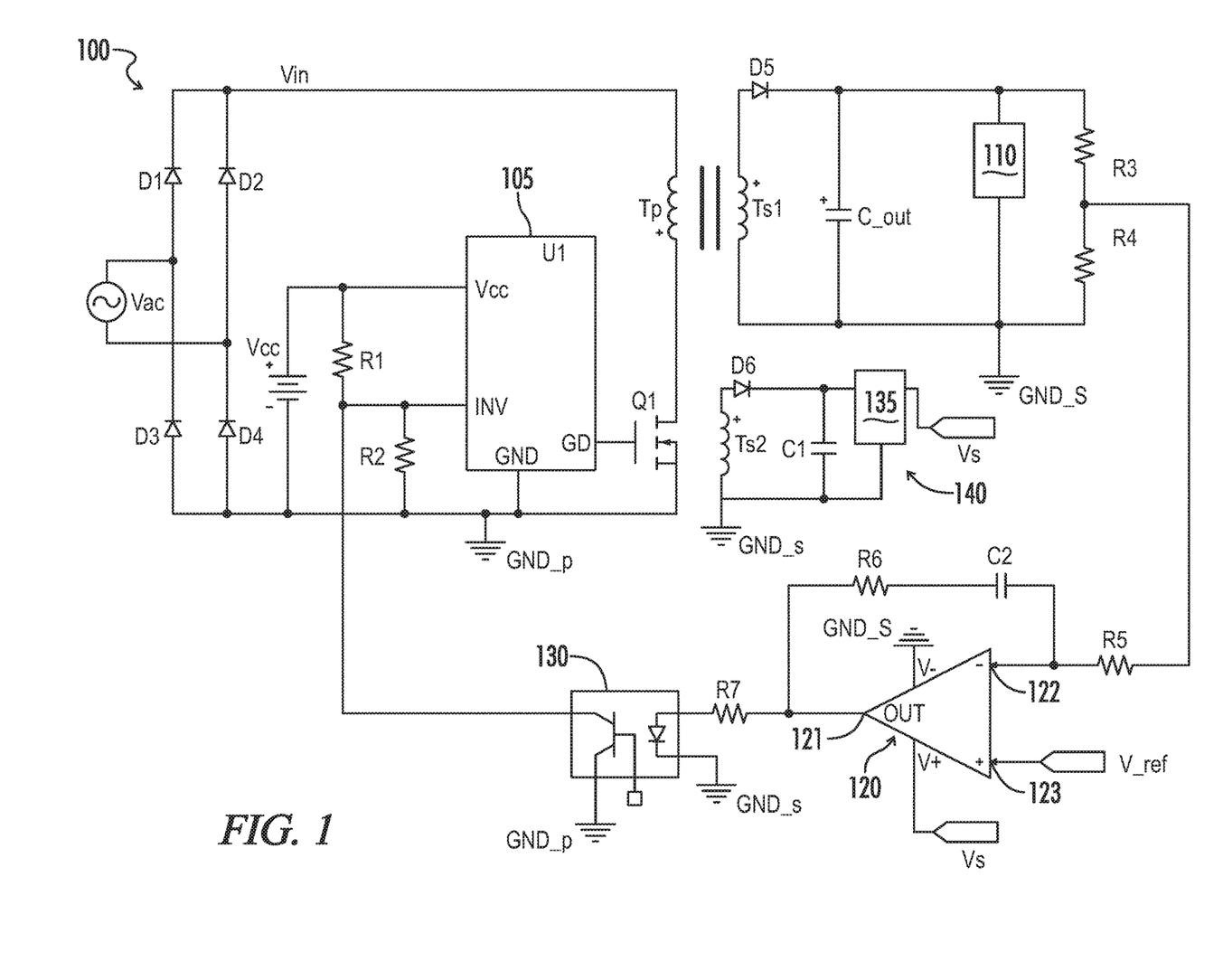
FIG. 1 is a circuit diagram representing a single stage flyback DC-DC converter for a lighting device with constant output voltage.

Referring to FIG. 1, a lighting device 100 is provided with a single stage flyback DC-DC converter to generate constant output voltage to a load 110. The lighting device may be an LED driver, and will hereafter generally be referred to as an LED driver, but the described DC-DC converter may be implemented for various alternative lighting devices as well. The LED driver 100 includes primary side and secondary side circuits that are electrically isolated via a flyback transformer having a primary winding Tp and secondary windings Ts1, Ts2.

The LED driver 100 receives power from an AC source (Vac), such as, for example, electrical mains within an office, a residence or other structure to be lighted. The AC input from the AC source is rectified by a full-wave bridge rectifier comprised of diodes D1-D4, which produces a half-wave DC voltage V_in on an input voltage bus. The DC voltage V_in is referenced to a primary side circuit ground reference GND_p. The primary winding Tp and a switching element Q1 are coupled in series between the input voltage bus and the primary side circuit ground reference.

The switching element Q1 is driven on and off via gate drive signals received from a controller 105 such as a gate drive integrated circuit (IC). A conventional example of the gate drive IC 105 may be an L6562 controller from STMicroelectronics, and is configured to enable and disable gate drive signals to the switching element Q1 based on various input signals. The represented example includes inputs for a power supply (Vcc) and an inverting input (INV) for an internal error amplifier, as well as a ground connection (GND) and a gate driver output connection (GD). It may be appreciated that the illustrated is non-limiting and that the gate drive IC or controller may include various additional or alternative input and output connections depending on the specific example implemented.

The secondary side circuit 130 includes the isolated secondary winding Ts1, a diode D5, and an output filter capacitor Cout coupled across first and second output terminals to which a load 110 may be connected. The load may comprise, for example, one or more light-emitting didoes (LEDs) that emit light when sufficient current passes through the LEDs. The secondary winding T1_S is coupled between a secondary side ground GND_S and an anode of the diode D5. The output capacitor C2 is coupled between a cathode of the diode D5 and the secondary side ground GND_S. The diode D5 is configured to allow energy stored in the secondary winding Ts1 to charge up the output capacitor Cout when the switching element Q1 is turned off.

A voltage divider composed of resistors R3 and R4 is coupled in series across the output terminals and used to sense the voltage across the load 110. When current flows through the load, a voltage develops across the resistor R4 that has a magnitude with respect to the secondary circuit ground reference GND_s that is proportional to the current flowing through the load. In one embodiment, the voltage dividing resistors may have very small resistance values of, for example, 0.1 ohm such that the effect of the resistance of the voltage divider on the load current is insignificant.

Because the intensity of the light emitted by the LEDs in the load 110 is dependent on the magnitude of the current flowing through the LEDs, the current is controlled closely. The voltage across resistor R4 is fed to a feedback circuit comprising a voltage control PI loop for constant voltage control. A comparison circuit is provided to compare the sensed output voltage and/or current through the load to a reference signal. The comparison circuit may be collectively embodied by an IC chip or may include discrete circuit components to effect the desired feedback signal. In FIG. 1, the PI voltage control loop comprises an operational amplifier (OPAMP) 120 having an inverting (−) input terminal 122, a non-inverting (+) input terminal 123, and an output on an output terminal 121. The voltage sensing node between resistors R3, R4 is connected to the inverting input of the operational amplifier via a series resistor R5. A feedback resistor R6 and a feedback capacitor C2 are connected in series between the output terminal of the operational amplifier and the inverting input. A reference voltage (V_ref) or a reference current having a magnitude corresponding therewith is connected to the non-inverting input of the operational amplifier. The reference signal V_ref may for example be provided from an external dimming control device, a local user interface, one or more sensors, a lighting management system, or the like. The magnitude of the reference current may be selected to produce a desired load current through the load. The reference current may be a fixed reference current to provide a constant load current, or the reference current may be a variable reference current to allow the load current to be varied to thereby change the intensity of the light emitted by the LEDs in the load. For example, a reference voltage may be generated by a dimmer circuit (not shown) that selectively produces a plurality of voltage levels corresponding to a plurality of load currents, wherein each magnitude of load current corresponds to a light intensity. The operational amplifier is responsive to the relative magnitudes of the reference signal and the sensed output signal to provide feedback to the gate drive IC 105 as described below.

An auxiliary power supply circuit 140 is coupled across another isolated secondary winding Ts2 of the flyback transformer, also referred to herein as an auxiliary winding or a tertiary winding of the transformer that is magnetically coupled to the primary winding Tp. An anode of diode D6 is coupled to a first end of the auxiliary winding Ts2 and the cathode of diode D6 is coupled to a first end of a small capacitor C1, a second end of which is coupled along with a second end of the auxiliary winding Ts2 to the secondary side ground reference GND_s. The diode D6 allows the energy stored in the auxiliary winding Ts2 to charge up the auxiliary capacitor C1 during off-times for the switching element Q1. The auxiliary capacitor C1 also server as the input of a voltage regulator 135. The output (Vs) of the voltage regulator then provides a positive voltage source for the aforementioned OPAMP 120, referenced to the secondary ground reference.

The output 121 of the operational amplifier 120 is connected to a first input of a photocoupler 130. The photocoupler (also referred to as an opto-isolator or an optocoupler) has an internal light generation section (e.g., an LED) coupled to the input of the photocoupler. In the illustrated embodiment, the output voltage from the operational amplifier is applied to the anode of the internal LED via the first input and a pullup resistor R7. The cathode of the internal LED is connected via a second input of the photocoupler to the secondary ground reference GND_S. The internal LED in the light generation section is responsive to a low voltage applied to the first input to generate light. The intensity of the generated light is responsive to the magnitude of the difference between the voltage on the first input and the secondary ground reference. The generated light is propagated internally to the base of a phototransistor in an output section within the same component. The phototransistor is responsive to the generated light to vary the conductivity and thereby to effectively vary the impedance of the phototransistor. The phototransistor has a collector that is connected to a voltage control node between resistors R1, R2. The phototransistor has an emitter that is connected to the primary circuit ground reference GND_P. As illustrated the photocoupler electrically isolates the secondary circuit voltages and the secondary circuit ground reference in the secondary circuit side from the components in the primary circuit side. The resistors R1, R2 are coupled in series between voltage source Vcc and the primary side ground reference GND_p. The voltage control node between the resistors R1, R2 is coupled to the inverting input pin (INV) of the controller/gate drive IC 105. Voltage source Vcc is further coupled between voltage supply pin (Vcc) of the gate drive IC 105 and primary side ground reference GND_p.

When the voltage applied to the first input of the photocoupler 130 from the output 121 of the operational amplifier 120 decreases, the conduction of the phototransistor in the output section of the photocoupler increases to effectively reduce the resistance from the control node between resistors R1, R2 to the primary circuit ground reference GND_P such that the current from the feedback circuit as a whole increases.

When the voltage applied to the first input of the photocoupler 130 increases, the conduction of the phototransistor in the output section of the photocoupler decreases to effectively increase the resistance from the control node between resistors R1, R2 to the primary circuit ground reference GND_P such that the current from the feedback circuit decreases.

Figure 2:
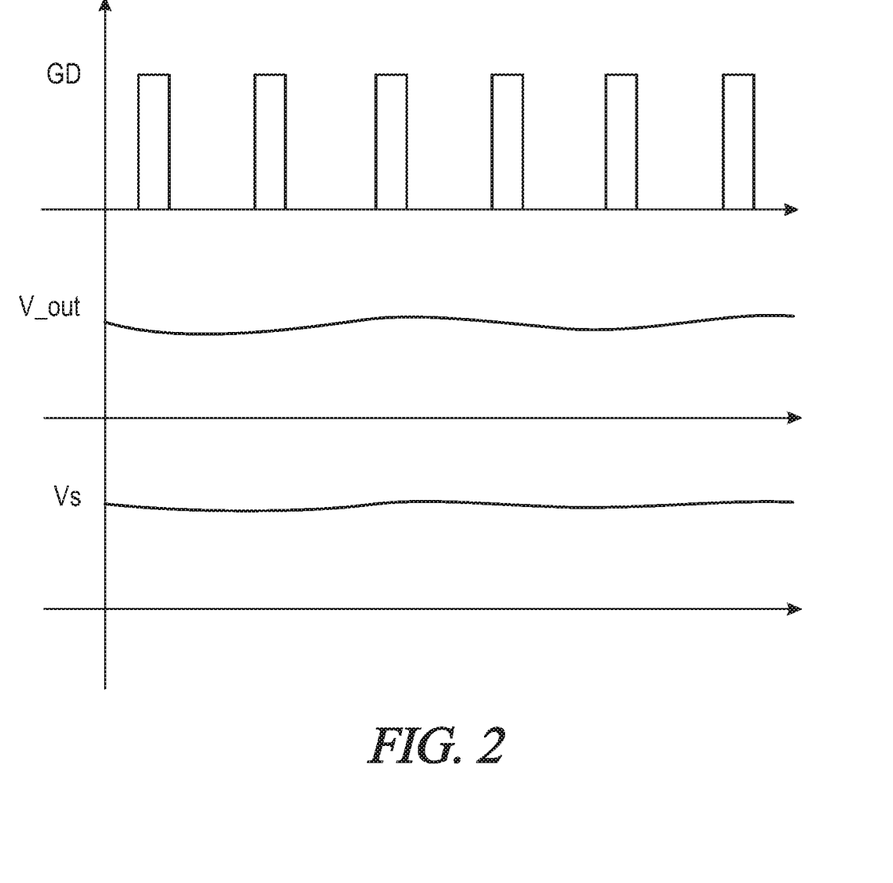
FIG. 2 is a graphical diagram representing an exemplary output voltage and auxiliary power supply output when a load is present on the DC-DC converter of FIG. 1.

Referring to FIG. 2, the gate drive IC 105 provides gate drive signals (GD) to the switching element Q1 according to its internal logic and based on the voltage feedback signal on the inverting input pin INV. As long as a load 110 is present the gate drive IC 105 drives the switching element Q1 continuously to maintain a desired constant output voltage (Vout) as set for example by the reference signal V_ref. The output voltage and the auxiliary supply voltage (Vs) are continuous and have very small ripple.

However, for non-standard operating conditions such as when the load is physically disconnected or the power converter is controlled in standby mode, the converter will not work continuously anymore. This is because the energy stored in the large output capacitor Cout (typically in 470 uF range) will only be discharged very slowly through the voltage divider resistors R3 and R4. These resistors R3 and R4 typically have very high resistance values to prevent excess power dissipation and generally improve the efficiency of the system.

Figure 3:
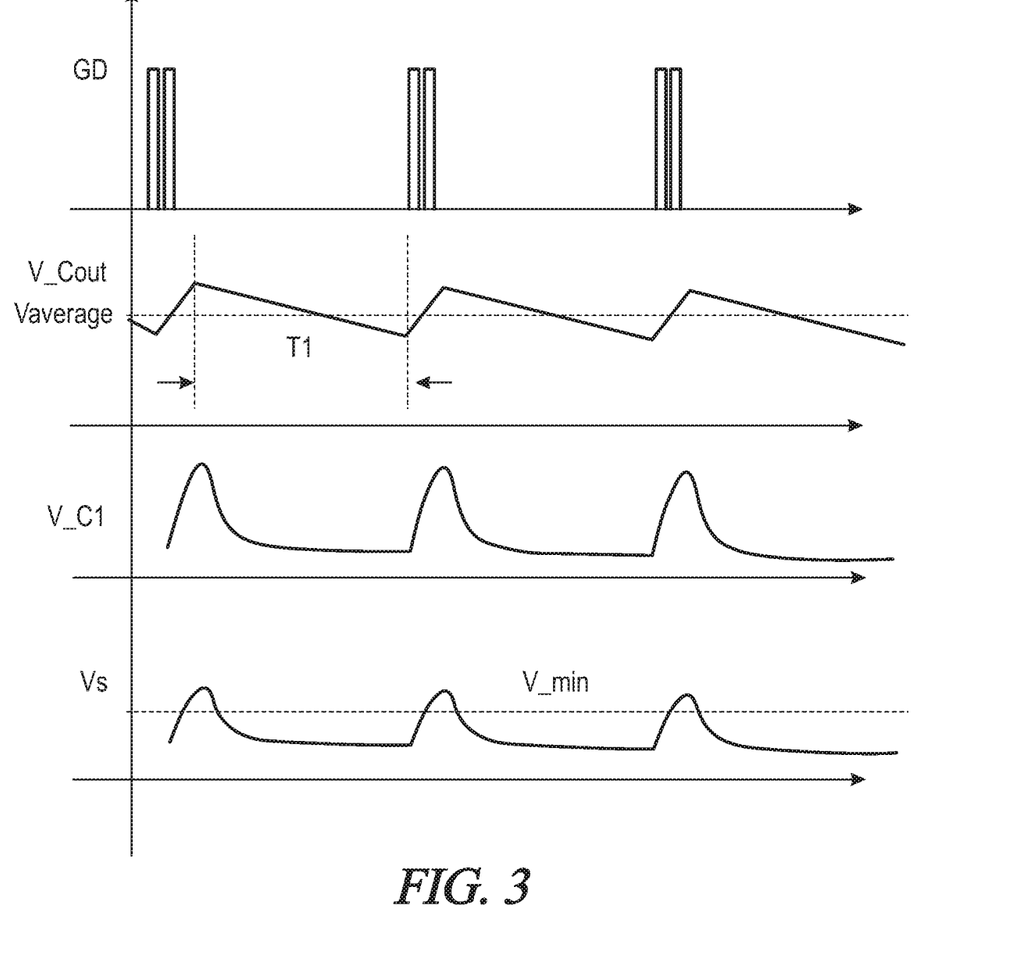
FIG. 3 is a graphical diagram representing an exemplary output voltage and auxiliary power supply output in a no-load or standby operating mode for the DC-DC converter of FIG. 1.

Referring next to FIG. 3, as a result of the long discharge time T1 of the output capacitor Cout, the gate drive IC 105 will force the converter to work in pulse mode (represented by the pulsed gate drive signals GD) to maintain control of an average value of the output voltage (Vaverage) during a standby mode or no-load operating mode. However, the auxiliary capacitor C1 is relatively small and typically cannot hold enough charge to supply the auxiliary power supply regulator 135 and the feedback circuit OPAMP 120. Note the illustrated rapid drop in the voltage Vc1 stored in the auxiliary capacitor C1, as a result of which the supply voltage Vs will not be stable enough to maintain the normal operating of OPAMP 120. When Vs drops below a minimum operating voltage of the OPAMP (V_min) the OPAMP will no longer function properly. As a result, the OPAMP will also be effectively unable to receive voltage control signals V_ref from an external device at no-load or standby mode.

It is very desirable to maintain a stable power supply for all control circuitry in the lighting device so that the system can receive reference commands at any time and control the circuit according to a desired dimming reference value V_ref.

Figure 4:
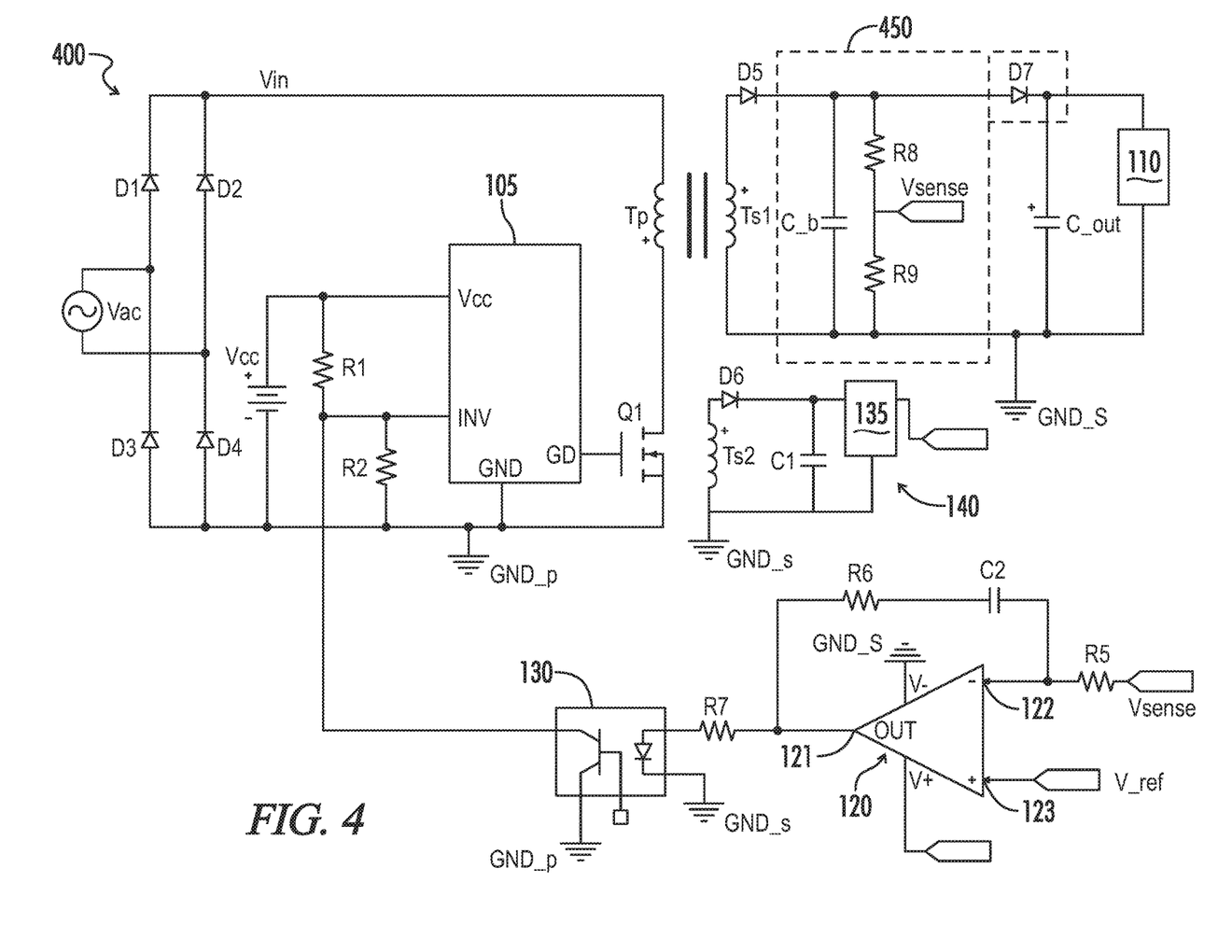
FIG. 4 is a circuit diagram representing an embodiment of a lighting device including an output buffer circuit as disclosed herein to stabilize the auxiliary power supply during no-load and/or standby operating conditions.

Referring now to FIG. 4, in an embodiment an output buffer circuit 450 is provided in the flyback DC-DC converter output stage of a lighting device 400 to achieve the aforementioned goal. The exemplary circuit includes a buffer capacitor Cb coupled on a first end to the cathode of diode D5 and on a second end to the secondary reference ground GND_s, and a diode having an anode coupled to the first end of the buffer capacitor and a cathode coupled to the first end of the output capacitor C_out. A pair of resistors R8 and R9 are coupled in series across the buffer capacitor, to sense the voltage across the buffer capacitor instead of the voltage across the output capacitor C_out for voltage control. A voltage sensing node between the resistors R8 and R9 is coupled to the inverting input 122 of the OPAMP 120 via resistor R5 to provide a feedback voltage (Vsense).

Figure 5:
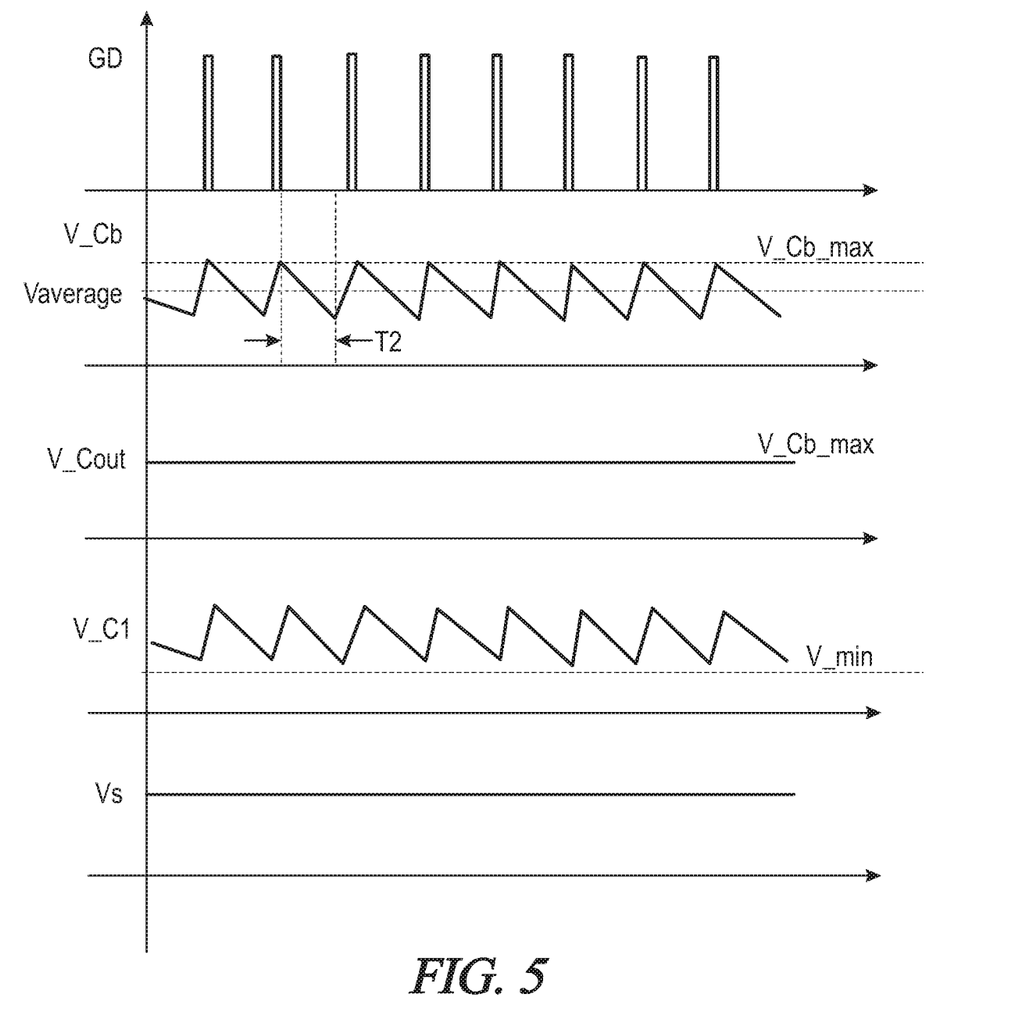
FIG. 5 is a graphical diagram representing exemplary gate drive signals, output voltage and auxiliary power supply output in a no-load or standby operating mode for the DC-DC converter of FIG. 4.

The buffer capacitor C_b is much smaller than the output capacitor C_out, sufficiently so that the discharge time of the buffer capacitor via resistors R8 and R9 will be very short. Referring next to FIG. 5, the discharge time V2 of the buffer capacitor C_b is demonstrably shorter than that of the output capacitor. Generally stated, the size of the buffer capacitor may be provided such that the discharge time V2 is less than a minimum time period between successive gate drive signals GD as to support a continuous operating mode. As a result, the gate drive signals GD of the controller/gate drive IC 105 will be continuously generated and able to maintain the average output voltage (V_average) across the buffer capacitor as set for example by the reference signal V_ref. The output capacitor C_out will be charged to the peak voltage V_Cb_max across the buffer capacitor and essentially remain constant at that level since there is a discharge path therefor. With the presence of continuous gate drive signals, the voltage V_C1 across the auxiliary capacitor C1 will also be continuous, but with a reasonable amount of ripple, as further illustrated in FIG. 5. The minimum voltage across the auxiliary capacitor is maintained at a value greater than a minimum input voltage (V_min) of the auxiliary regulator 135, wherein a stable auxiliary power supply Vs is provided to the OPAMP 120.

Accordingly, an embodiment of a lighting device 400 as disclosed herein, having an output buffer circuit at least as described above can successfully maintain a power supply for the control circuitry so that feedback response will be fast and reliable whenever the reference value V_ref changes.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

The term "coupled" means at least either a direct electrical connection between the connected items or an indirect connection through one or more passive or active intermediary devices.

The term "circuit" means at least either a single component or a multiplicity of components, either active and/or passive, that are coupled together to provide a desired function. Terms such as "wire," "wiring," "line," "signal," "conductor," and "bus" may be used to refer to any known structure, construction, arrangement, technique, method and/or process for physically transferring a signal from one point in a circuit to another. Also, unless indicated otherwise from the context of its use herein, the terms "known," "fixed," "given," "certain" and "predetermined" generally refer to a value, quantity, parameter, constraint, condition, state, process, procedure, method, practice, or combination thereof that is, in theory, variable, but is typically set in advance and not varied thereafter when in use.

The terms "switching element" and "switch" may be used interchangeably and may refer herein to at least: a variety of transistors as known in the art (including but not limited to FET, IGBT, IGFET, etc.), a switching diode, a silicon controlled rectifier (SCR), a diode for alternating current (DIAC), a triode for alternating current (TRIAC), a mechanical single pole/double pole switch (SPDT), or electrical, solid state or reed relays. Where either a field effect transistor (FET) or a bipolar junction transistor (BJT) may be employed as an embodiment of a transistor, the scope of the terms "gate," "drain," and "source" includes "base," "collector," and "emitter," respectively, and vice-versa.

The terms "controller," "control circuit" and "control circuitry" as used herein may refer to, be embodied by or otherwise included within a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. A general purpose processor can be a microprocessor, but in the alternative, the processor can be a microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

The previous detailed description has been provided for the purposes of illustration and description. Thus, although there have been described particular embodiments of a new and useful invention, it is not intended that such references be construed as limitations upon the scope of this invention except as set forth in the following claims.

What is claimed is:

1. A lighting device comprising:
    first and second input terminals for receiving a DC supply voltage;
    one or more switching elements coupled to at least one of the first and second input terminals, wherein the one or more switching elements are driven on and off by received gate drive signals to provide a current through a primary winding of an isolation transformer;
    a first energy storage device coupled across first and second output terminals for connecting to a load;
    an output circuit coupled between a secondary winding of the isolation transformer and the first and second output terminals, wherein the output circuit comprises a second energy storage device coupled across the secondary winding and a diode connected between respective first ends of the first and second energy storage devices;
    a feedback circuit configured to receive a first signal corresponding to the voltage across the second energy storage device, and provide a feedback control signal based on a difference between the first signal and a reference signal;
    an auxiliary power supply comprising a tertiary winding magnetically coupled to the primary winding of the isolation transformer, wherein an auxiliary power supplied to the feedback circuit corresponds to current received through the tertiary winding; and
    a controller configured to provide the gate drive signals to the one or more switching elements responsive to at least the feedback control signal, wherein a voltage across the second energy storage device is maintained at a constant value corresponding to the reference signal;
    wherein the auxiliary power supply further comprises a third energy storage device coupled across the tertiary winding, and a second controller coupled in parallel with the third energy storage device to receive an input voltage;
    wherein the second controller is configured to generate the auxiliary power to supply the feedback circuit, and a voltage across the third energy storage device is controlled during a non-standard condition of the lighting device to be at least a minimum input voltage for the second controller.

2. The lighting device of claim 1, wherein the reference signal is a dimming reference signal received by the feedback circuit from an external dimming device.

3. The lighting device of claim 1, wherein a discharge time of the second energy storage device during a non-standard condition of the lighting device is less than a time between successive gate drive signals as corresponding to continuous operation of the auxiliary power supply and the feedback circuit.

4. The lighting device of claim 3, wherein the non-standard condition comprises a standby condition.

5. The lighting device of claim 3, wherein the non-standard condition comprises a no-load condition.

6. The lighting device of claim 1, wherein a discharge time of the second energy storage device during a non-standard condition of the lighting device is less than a time between successive gate drive signals, wherein an output voltage is continuously maintained across the first energy storage device.

7. The lighting device of claim 6, wherein the non-standard condition comprises a standby condition.

8. The lighting device of claim 6, wherein the non-standard condition comprises a no-load condition.

9. A lighting device comprising:
a DC input stage comprising at least one switching element driven on and off to provide a current through a primary winding of an isolation transformer;
a buffer capacitor coupled across a secondary winding of the isolation transformer;
an output capacitor coupled in parallel with the buffer capacitor and across first and second output terminals for connecting to a load;
a feedback circuit configured to receive a first signal corresponding to the voltage across the buffer capacitor, wherein the feedback circuit is further configured to provide a feedback control signal based on a difference between the first signal and a reference signal;
a controller configured to provide gate drive signals to the at least one switching element responsive to at least the feedback control signal;
an auxiliary power supply comprising
a tertiary winding magnetically coupled to the primary winding of the isolation transformer, wherein an auxiliary power supplied to the feedback circuit corresponds to current received through the tertiary winding,
an auxiliary capacitor coupled across the tertiary winding, and
a second controller coupled in parallel with the auxiliary capacitor to receive an input voltage; and
the buffer capacitor is configured to discharge in a period of time less than an off-time for the at least one switching element, wherein continuous operation of the at least one switching element and the auxiliary power supply is provided during a no-load condition across the first and second output terminals;
wherein the second controller is configured to generate the auxiliary power to supply the feedback circuit, and a voltage across the auxiliary capacitor is controlled during the no-load condition of the lighting device to be at least a minimum input voltage for the second controller.

10. The lighting device of claim 9, wherein the reference signal is a dimming reference signal received by the feedback circuit from an external dimming device.

11. The lighting device of claim 9, wherein continuous operation of the at least one switching element is also provided during a standby operating condition.

12. A lighting device comprising:
a DC input stage comprising at least one switching element driven on and off to provide a current through a primary winding of an isolation transformer;
a buffer capacitor coupled across a secondary winding of the isolation transformer;
an output capacitor coupled in parallel with the buffer capacitor and across first and second output terminals for connecting to a load;
a feedback circuit configured to receive a first signal corresponding to the voltage across the buffer capacitor, wherein the feedback circuit is further configured to provide a feedback control signal based on a difference between the first signal and a reference signal;
a controller configured to provide gate drive signals to the at least one switching element responsive to at least the feedback control signal;
an auxiliary power supply comprising
a tertiary winding magnetically coupled to the primary winding of the isolation transformer, wherein an auxiliary power supplied to the feedback circuit corresponds to current received through the tertiary winding,
an auxiliary capacitor coupled across the tertiary winding, and
a second controller coupled in parallel with the auxiliary capacitor to receive an input voltage,
wherein the second controller is configured to generate the auxiliary power to supply the feedback circuit, and a voltage across the auxiliary capacitor is controlled during the non-standard condition of the lighting device to be at least a minimum input voltage for the second controller; and
the buffer capacitor is configured to discharge during a non-standard condition of the lighting device is less than a time between successive gate drive signals, wherein an output voltage is continuously maintained across the output capacitor.

13. The lighting device of claim 12, wherein the reference signal is a dimming reference signal received by the feedback circuit from an external dimming device.

14. The lighting device of claim 12, wherein the non-standard condition comprises a standby condition.

15. The lighting device of claim 12, wherein the non-standard condition comprises a no-load condition.

* * * * *